US008596726B2

(12) United States Patent
Kondo et al.

(10) Patent No.: US 8,596,726 B2
(45) Date of Patent: Dec. 3, 2013

(54) WHEEL FOR VEHICLE

(75) Inventors: Kazunori Kondo, Tokyo (JP); Takehiro Fujioka, Tokyo (JP)

(73) Assignee: Topy Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/635,247

(22) PCT Filed: Jun. 27, 2011

(86) PCT No.: PCT/JP2011/064667
§ 371 (c)(1),
(2), (4) Date: Jan. 28, 2013

(87) PCT Pub. No.: WO2012/002319
PCT Pub. Date: Jan. 5, 2012

(65) Prior Publication Data
US 2013/0119749 A1  May 16, 2013

(30) Foreign Application Priority Data
Jun. 30, 2010  (JP) .................................. 2010-150097

(51) Int. Cl.
*B60B 3/10* (2006.01)
(52) U.S. Cl.
USPC .................................. 301/64.101; 301/63.103
(58) Field of Classification Search
USPC ............ 301/63.101, 63.103, 63.104, 63.107, 301/64.101; 29/894.322, 894.325
See application file for complete search history.

(56) References Cited

U.S. PATENT DOCUMENTS

| 1,711,833 | A | 5/1929 | Crissman |
| 2,159,880 | A | 5/1939 | Wheel |
| 3,391,439 | A | 7/1968 | Bulgrin et al. |
| 5,388,330 | A | 2/1995 | Daudi |
| 7,059,685 | B2 | 6/2006 | Kermelk et al. |
| 7,104,611 | B2 | 9/2006 | Alff et al. |
| 7,469,973 | B2 | 12/2008 | Coleman et al. |

(Continued)

FOREIGN PATENT DOCUMENTS

| EP | 1 262 333 | 12/2002 |
| JP | S57-134301 | 8/1982 |

(Continued)

OTHER PUBLICATIONS

International Search Report corresponding to International Patent Application No. PCT/JP2011/064667 dated Sep. 27, 2011.

(Continued)

*Primary Examiner* — Jason Bellinger
(74) *Attorney, Agent, or Firm* — Jenkins, Wilson, Taylor & Hunt, P.A.

(57) ABSTRACT

An automobile wheel 10 comprising: (a) a rim 20; and (b) a disc 30 including: a plurality of spokes 33; and a disc flange 35 positioned at an outside end in the wheel radial direction, the disc having decorative holes 34, in which the rim and the disc flange are joined together, wherein a part of the disc flange, which corresponds to a radially outside end S of each of the spokes, is cut out toward an outside in a wheel axial direction relative to a disc-flange inside end edge 35a of the disc flange on an inside in the wheel axial direction to form a notch 36, and a minimum distance $a_1$ between the notch and an outer periphery of the decorative hole is smaller than a width $a_2$ of the disc flange at a middle position $C_D$ of the decorative hole.

3 Claims, 13 Drawing Sheets

(56) References Cited

U.S. PATENT DOCUMENTS

| | | |
|---|---|---|
| 7,895,752 B2 | 3/2011 | Sano et al. |
| 7,922,260 B2 | 4/2011 | Rodrigues |
| 8,454,099 B2 | 6/2013 | Sano et al. |
| 2003/0080608 A1 | 5/2003 | Coleman et al. |
| 2004/0227392 A1 | 11/2004 | Coleman et al. |
| 2006/0071539 A1 | 4/2006 | Sereno |
| 2007/0175037 A1 | 8/2007 | Coleman et al. |
| 2007/0222279 A1 | 9/2007 | Csapo et al. |
| 2010/0253134 A1 | 10/2010 | Sano et al. |
| 2010/0289323 A1 | 11/2010 | Sano et al. |

FOREIGN PATENT DOCUMENTS

| | | |
|---|---|---|
| JP | 58-032001 | 3/1983 |
| JP | 63-108924 | 5/1988 |
| JP | H03-005602 | 1/1991 |
| JP | 09-095101 | 4/1997 |
| JP | 11-254901 | 9/1999 |
| JP | 2004-001704 | 8/2004 |
| JP | 2004-243925 | 9/2004 |
| JP | 2005-035330 | 2/2005 |
| JP | 2005-119355 | 5/2005 |
| JP | 2006-275536 | 10/2006 |
| JP | 2007-191025 | 8/2007 |
| JP | 2007-302178 | 11/2007 |
| JP | 2008-114723 | 5/2008 |
| JP | 2009-113798 | 5/2009 |
| JP | 2009-113799 | 5/2009 |
| JP | 2009-190607 | 8/2009 |
| WO | WO03/043836 | 5/2003 |
| WO | WO2007/089750 | 8/2007 |
| WO | WO2009/051229 | 4/2009 |
| WO | WO2009/051230 | 4/2009 |
| WO | WO2012/002319 | 1/2012 |

OTHER PUBLICATIONS

Japanese Industrial Standard JIS D 4103:1998 "Automobile parts—Disc wheels—Performance requirements and marking" (34 pages).

Notification of Transmittal of Translation of the International Preliminary Report on Patentability (Chapter I or Chapter II of the Patent Cooperation Treaty) corresponding to International Patent Application No. PCT/JP2011/064667 dated Feb. 21, 2013.

Decision to Grant a Patent corresponding to Japanese Patent Application No. 2012-522618 dated Jul. 30, 2012.

International Search Report corresponding to International Patent Application No. PCT/JP2008/068868 dated Jan. 20, 2009.

International Search Report corresponding to International Patent Application No. PCT/JP2008/068869 dated Jan. 20, 2009.

Notification of Transmittal of Translation of the International Preliminary Report on Patentability (Chapter I or Chapter II of the Patent Cooperation Treaty) corresponding to International Patent Application No. PCT/JP2008/068868 dated May 20, 2010.

Notification of Transmittal of Translation of the International Preliminary Report on Patentability (Chapter I or Chapter II of the Patent Cooperation Treaty) corresponding to International Patent Application No. PCT/JP2008/068869 dated May 20, 2010.

Written Opinion of the International Searching Authority corresponding to International Patent Application No. PCT/JP2008/068868 dated Jan. 20, 2009.

Written Opinion of the International Searching Authority corresponding to International Patent Application No. PCT/JP2008/068869 dated Jan. 20, 2009.

WHEEL FOR VEHICLE

FIELD OF THE INVENTION

The present invention relates to a wheel for vehicle such as automobile.

DESCRIPTION OF THE RELATED ART

Cheap and low-cost steel wheels have been widely used. However, these steel wheels have a problem with their poor design, compared to aluminum wheels. Thus, in recent years, steel wheels having thin spokes and large decorative holes have been developed to provide a similar appearance to aluminum wheels. (See Patent Documents 1 to 3).

The Patent Document 1 discloses a stamped disc having spokes formed integrally with a ring portion extending along the entire circumference of the stamped disc, and a rim welded to the disc. Further, the Patent Document 1 discloses that a notch is provided on the ring portion, such that the notch does not interfere with an air stem (valve hole) on the rim when the rim is welded to the disc to weld the ring portion to a shoulder portion of the rim.

According to the description in the Patent Document 2, a periphery of each decorative hole on a disc is subjected to drawing to form a raised wall so as to secure sufficient strength, thereby reducing the width of the spokes which are provided between the adjacent decorative holes. Further, the disc is formed with a disc flange in the circumferential direction, and the disc flange is welded to a rim.

According to the description in the Patent Document 3, a single piece of metal sheet is formed into a disc, and the disc includes a plurality of spokes units and a ring-shaped disc edge that connects the outer ends of the spoke units together. Also according to the Patent Document 3, each of the spoke units includes two spoke bars (reinforcing ribs), and the disc edge is positioned on an inner circumference of a rim well (drop portion) to be joined together.

However, in the case that the disc includes those integrally-formed thin spokes and large decorative holes, the ring portion (disc flange or disc edge) has, at its decorative-hole portion, the minimum width, and thus has the lowest strength. This can cause the decorative-hole portion to be deformed by forming the disc, and thus can cause an end edge of the ring portion to undulate. Thus, welding the ring portion at its decorative-hole portion results in poor welding and insufficient joint strength.

Accordingly, a wheel has been developed in which the spokes each have a curved-surface connecting portion that is formed at an extending portion of the spoke so that the disc flange is connected to the spoke via the curved-surface connecting portion (see Patent Document 4). By this, since the width of a material in a wheel radial direction is larger and thus the material has higher strength at the curved-surface connecting portion, an end edge of the disc flange is less likely to undulate due to the bending.

RELATED ART DOCUMENT

Patent Document

[Patent Document 1] Japanese Unexamined Patent Application Publication No. 2004-001704

[Patent Document 2] Japanese Unexamined Patent Application Publication No. 2005-119355

[Patent Document 3] European Patent No. 1 262 333 (claims 1 and 3)

[Patent Document 4] Japanese Unexamined Patent Application Publication No. 2009-113798

PROBLEMS TO BE SOLVED BY THE INVENTION

However, it has been found that as the disc is provided with larger decorative holes, the disc flange has lower rigidity, and therefore when the disc flange is formed by pressing the disc or the like after punching the decorative holes on the disc, a part of the disc flange, which is close to corners of the decorative holes on the distal-end side of the spoke, is drawn, thereby reducing a material thickness of the disc flange and causing an edge of the disc flange to be easily cracked.

Thus, the object of the present invention is to provide a wheel for vehicle including a disc that includes spokes and a disc flange that connects respective distal ends of the spokes together in a disc circumferential direction, wherein deformation of the disc flange and cracks that occur at a corner of a decorative hole during forming the disc are prevented, and durability of the wheel improves.

SUMMARY OF THE INVENTION

The present invention provides a wheel for vehicle comprising: (a) a rim having a drop portion; and (b) a disc including: a plurality of spokes that radially extend toward an outside in a wheel radial direction; and a disc flange that is positioned at an outside end in the wheel radial direction and that connects distal ends of the spokes on the outside in the wheel radial direction together in a disc circumferential direction, the disc having decorative holes each formed between the spokes, the decorative hole having a corner in the disc circumferential direction, in which the rim and the disc flange are joined together, wherein a part of the disc flange, which corresponds to a radially outside end of each of the spokes, is cut out toward an outside in a wheel axial direction relative to a disc-flange inside end edge of the disc flange on an inside in the wheel axial direction to form a notch, and a minimum distance $a_1$ between the notch and an outer periphery of the decorative hole is smaller than a width $a_2$ of the disc flange in the wheel axial direction at a position of the decorative hole in the disc circumferential direction, excluding the corner.

In this embodiment, a part of the disc flange, which has the minimum distance $a_1$ smaller than the width $a_2$, is formed on a neck portion with a small width. Thus, forming the disc by pressing or the like in the wheel axial direction causes a force to be applied to an area around the decorative hole in a predetermined direction, and also allows a material to be easily flowed to the corner of the decorative hole proximate to the neck portion. This prevents cracks from occurring at the corner due to the forming. In addition, the neck portion with a small width is easily bent in a width direction, and accordingly, the material around the corner of the decorative hole is not easily elongated in the circumferential direction of the decorative hole. This further prevents cracks from occurring at the corner due to the forming.

Preferably, a part of the disc flange, which corresponds to a widthwise center line of the spoke, has a middle piece that extends toward the inside in the wheel axial direction relative to an outermost edge of the notch in the wheel axial direction, and the middle piece is fitted to the rim.

In this embodiment, when the disc flange is joined to the rim (such as by welding) at a joint portion of the middle piece, a force is effectively transmitted from the rim toward the spoke, thereby improving durability of the wheel.

Preferably, a fitting area between the middle piece and the rim is welded and joined together.

Effects of the Invention

According to the present invention, deformation of the disc flange and cracks that occur at the corner of the decorative hole during forming the disc are prevented, so that a wheel for vehicle with improved strength, assembly accuracy, and durability is obtained.

DESCRIPTION OF THE EMBODIMENTS

Embodiments of the present invention will be described below. In the following descriptions, a steel wheel manufactured from sheet steel is applied as an example. However, the present invention covers not only the steel wheel, but also other material (for example, titanium, aluminum, magnesium, and alloy thereof) of wheels, as long as a disc is formed from a sheet blank by bending an outer periphery of the blank by drawing or the like to form a flange.

In contrast, the present invention does not cover a casting (forged) disc that is integrally and thickly formed from aluminum, magnesium or the like by casting.

Preferably, the wheel of the present invention meets the official standard for fatigue strength. However, the present invention may also be applied to wheels which have no official standard for fatigue strength to meet, such as wheels for industrial (agricultural) vehicles and spare wheels for emergency use (including temporary wheels for automobile).

It should be noted that the official standard for fatigue strength refers to Japanese Industrial Standards (JIS) D 4103 "Automobile parts-Disc wheel s-Performance requirements and marking," and however, if the JIS D 4103 is subject to modification in the future, the official standard for fatigue strength will refer to the modified official wheel fatigue strength provided by JIS (and/or International Standards Organization (ISO)) at the time of the modification.

In the following descriptions, a term "outside in the (wheel or disc) radial direction" and a term "inside in the (wheel or disc) radial direction" respectively refer to a radially outer circumferential side of the wheel (the disc) and a radially central side of the wheel (the disc). In addition, a term "outside in the (wheel or disc) axial direction" and a term "inside in the (wheel or disc) axial direction" respectively refer to an axially outer part and an axially inner (vehicle-side) part of the wheel, when the wheel is mounted on the vehicle and viewed in the wheel axial direction. A term "disc circumferential direction" is also referred to as "wheel circumferential direction."

Figure 1:
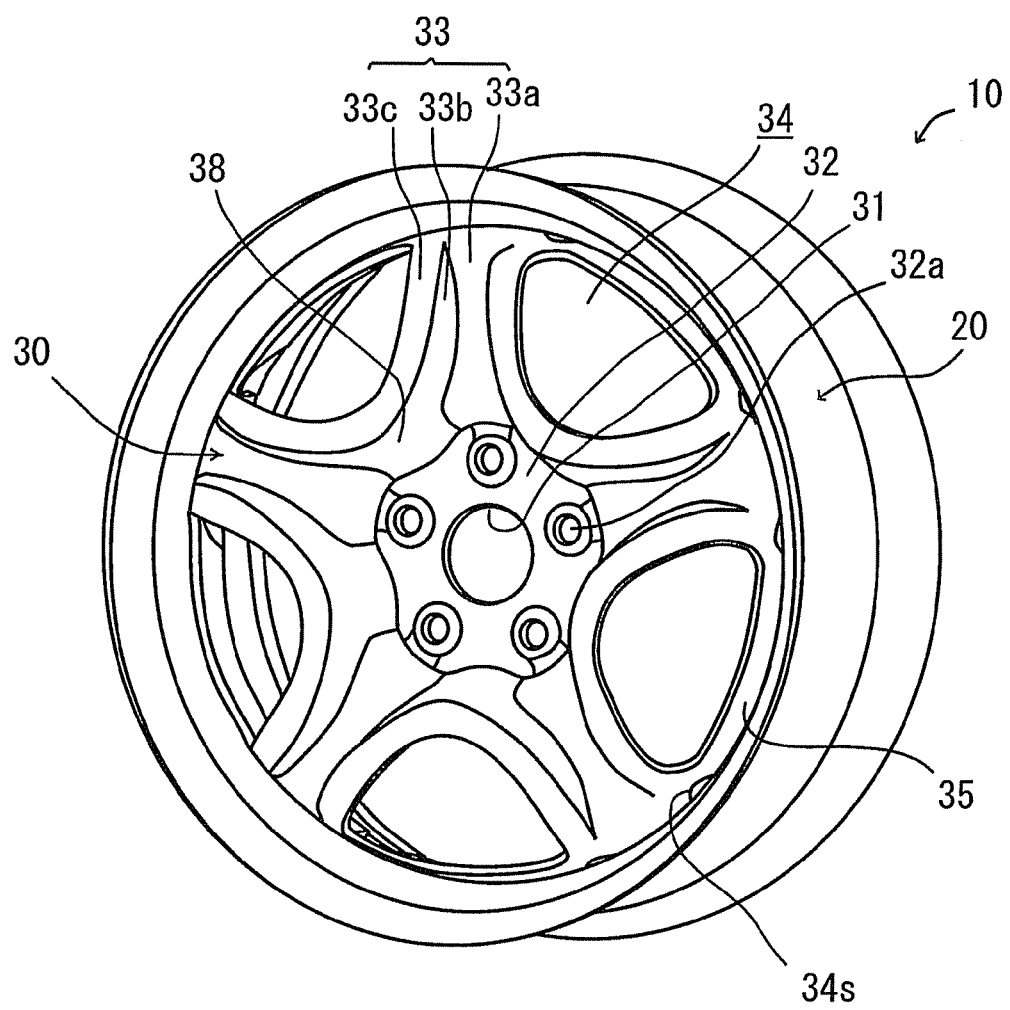
FIG. 1 is a perspective view of an automobile wheel according to a first embodiment of the present invention, when viewed from the outside in a wheel axial direction.
Figure 2:
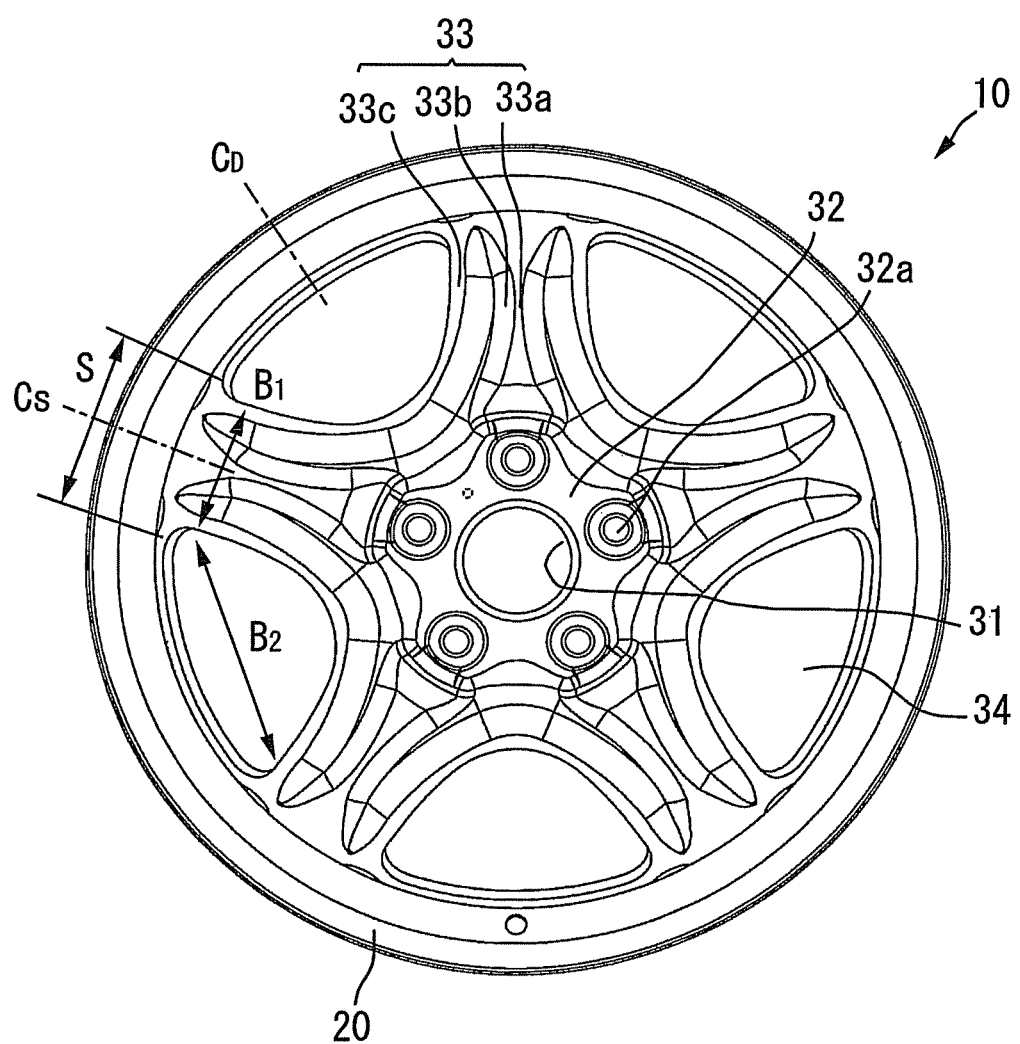
FIG. 2 is a front view of the automobile wheel according to the first embodiment of the present invention.

FIG. 1 is a perspective view of a wheel 10 for vehicle (an automobile wheel) according to a first embodiment of the present invention, when viewed from the outside in the wheel axial direction. FIG. 2 is a front view of the wheel 10 for vehicle.

The automobile wheel 10 (hereinafter also simply referred to as "wheel") is a two-piece wheel having a rim 20 and a disc 30 that are made of steel and that are joined together into one by welding or by using a connecting member (not shown) such as a rivet.

Figure 16:
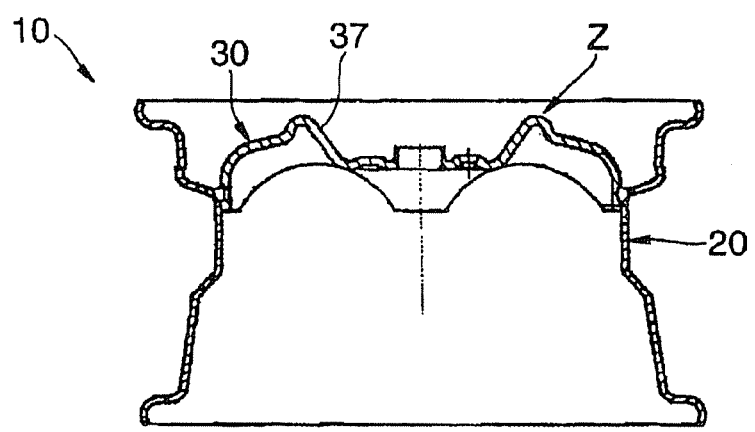
FIG. 16 is a cross-sectional view showing a shape of a typical automobile wheel different from the wheel of the present invention.
Figure 17:
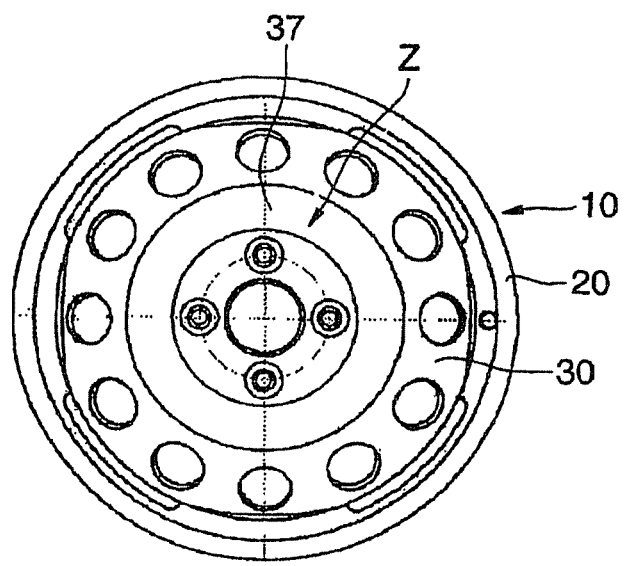
FIG. 17 is a front view showing the shape of the typical automobile wheel different from the wheel of the present invention.

The disc 30 is manufactured from a sheet material, and includes a hub hole 31, a hub mounting portion 32, spokes 33, decorative holes 34, a disc flange 35, inclined portions 37 (see FIG. 3 and FIG. 4), and protrusions 38. The disc 30 does not have an annular protrusion Z that is usually employed for typical automobile wheels and that extends continuously in the circumferential direction along an outside part of the inclined portion 37 in the disc radial direction and protrudes in the wheel axial direction, as shown in FIG. 16 and FIG. 17.

As shown in FIG. 2, the hub hole 31 is provided at a center of the disc 30 in the wheel radial direction, and the hub mounting portion 32 is provided around the hub hole 31. The hub mounting portion 32 is formed into a flat shape or a substantially flat shape on a plane perpendicular to or substantially perpendicular to the wheel axial direction. The hub mounting portion 32 includes five hub mounting bolt holes 32a that are provided concentrically with the hub hole 31 at regular intervals. However, the number of the hub mounting bolt holes 32a is not limited to five. Hub mounting bolts (not shown) extending from a hub (not shown) are inserted through the hub mounting bolt holes 32a, and hub nuts (not shown) are screwed respectively onto the hub mounting bolts, thereby fixing the disc 30 (the wheel 10) to the hub.

Figure 3:
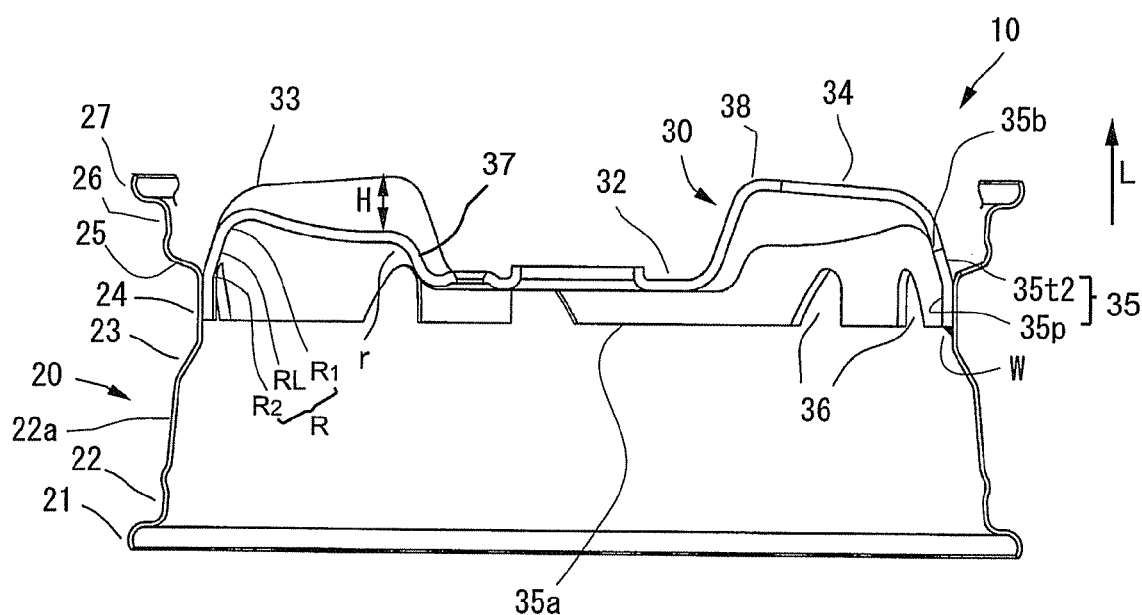
FIG. 3 is a cross-sectional view of the automobile wheel according to the first embodiment of the present invention, obtained by cutting away in the wheel axial direction along a line passing through a wheel axis, in which the left side of FIG. 3 shows a cross section of the automobile wheel, taken along a center line $C_s$ of the spoke, while the right side of FIG. 3 shows a cross section of the automobile wheel, taken along a line passing through a middle position $C_D$ of a decorative hole in a disc circumferential direction.

As shown in FIG. 3, in the wheel axial direction L, an inside surface of the hub mounting portion 32 in the wheel axial direction is positioned on the outside in the wheel axial direction relative to an inside end of the disc-flange 35 in the wheel axial direction (a disc-flange inside end edge 35a), while the inside surface of the hub mounting portion 32 being positioned on the inside in the wheel axial direction relative to a decorative-hole end portion of the disc flange 35 (a disc-flange outside end edge 35b on the outside in the wheel axial direction L (see FIG. 4)). However, the inside surface of the hub mounting portion 32 in the wheel axial direction may be positioned on the inside relative to the disc-flange inside end edge 35a or may be positioned on the outside relative to the disc-flange outside end edge 35b. In an example shown in FIG. 2, the hub mounting bolt holes 32a each are positioned on a widthwise center line Cs of the spoke 33. However, the hub mounting bolt holes 32a each may be positioned between the adjacent spokes 33 (i.e. on a line passing through a middle position $C_D$ of the decorative hole 34 in the disc circumferential direction), for example.

Five long piece like spokes 33 extend radially from the hub mounting portion 32 to the outside in the wheel radial direction (see FIG. 2). The spokes 33 each have an outside end (distal end) in the wheel radial direction. The distal end is bent toward the inside in the wheel axial direction to form an outer-circumferential-side curved-surface connecting portion R. The outer-circumferential-side curved-surface connecting portion R is connected to the disc flange 35 that is formed into a ring shape (including a shape extending intermittently in the circumferential direction) (see FIG. 3). The disc flange 35 extends in the wheel axial direction and is formed with a surface extending in the wheel axial direction to be fitted into the rim 20. The disc flange 35 has a function of connecting the respective spokes 33 together each via the outer-circumferential-side curved-surface connecting portion R to ensure sufficient strength. In contrast, the spokes 33 each have an inside end in the wheel radial direction. The inside end is bent toward the inside in the wheel axial direction to form an inner-circumferential-side curved-surface connecting portion r. The inner-circumferential-side curved-surface connecting portion r is connected to the hub mounting portion 32 via the inclined portion 37. The spokes 33 each extend between the outer-circumferential-side curved-surface connecting portion R and the inner-circumferential-side curved-surface connecting portion r in a direction perpendicular to or substantially perpendicular to the wheel axial direction.

Figure 9:
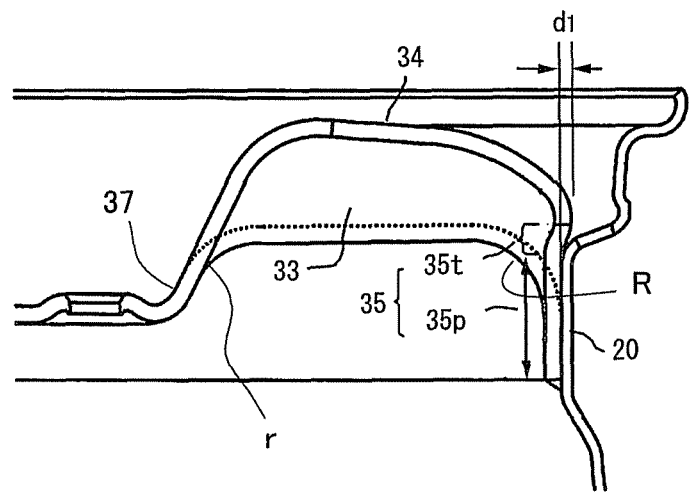
FIG. 9 is a cross-sectional view of a fitting area between a rim and a disc according to another embodiment of the invention.
Figure 10:
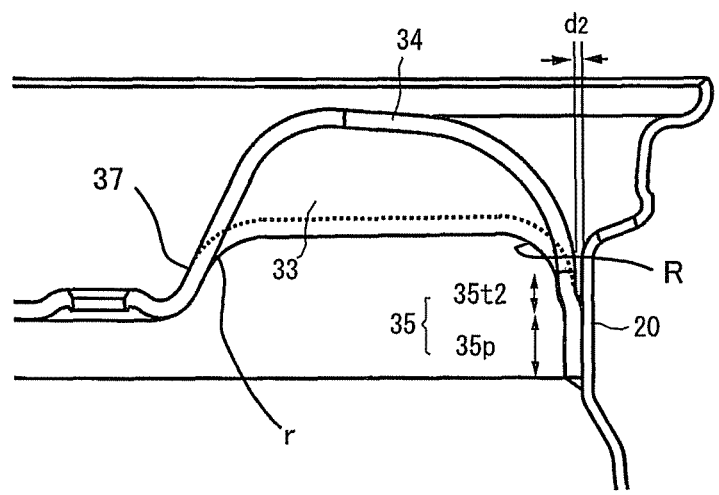
FIG. 10 is a cross-sectional view of a fitting area between a rim and a disc according to still another embodiment of the invention.
Figure 15:
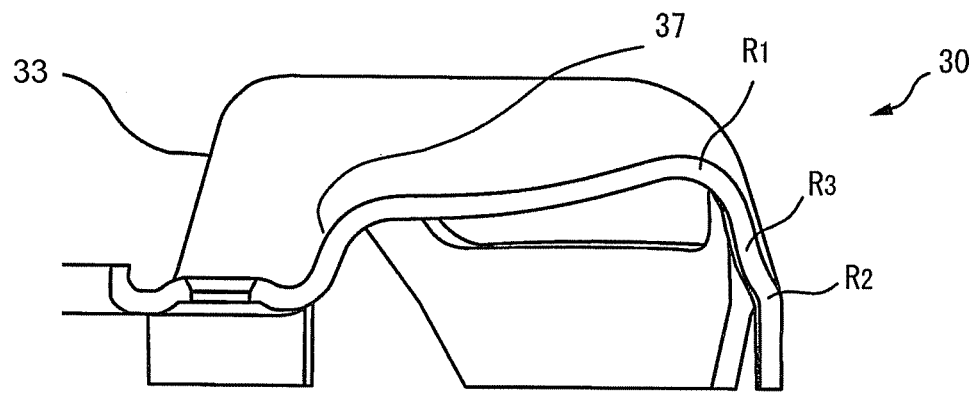
FIG. 15 is a partial cross-sectional view of a spoke of the disc according to the another modification of the first embodiment of the invention, obtained by cutting away in the wheel radial direction along a line passing through the wheel axis.

As shown in FIG. 3, the outer-circumferential-side curved-surface connecting portion R may include a first curved-surface portion R1, a second curved-surface portion R2, and a conical connecting portion RL between the first curved-surface portion R1 and the second curved-surface portion R2. The conical connecting portion RL may be inclined substantially linearly in cross section. Alternatively, the outer-circumferential-side curved-surface connecting portion R may be a single curved-surface connecting portion, as shown in FIG. 9 and FIG. 10. Further alternatively, as shown in FIG. 15, the outer-circumferential-side curved-surface connecting portion R may include the first curved-surface portion R1, the second curved-surface portion R2, and a third curved-surface portion R3 between the first curved-surface portion R1 and the second curved-surface portion R2. As shown in FIG. 15, the third curved-surface portion R3 may have a curvature in the opposite direction to the curvatures of the first curved-surface portion R1 and the second curved-surface portion R2 (i.e. the third curved-surface portion R3 is recessed toward the inside in the radial direction, when viewed from the outside in the radial direction). Alternatively, the third curved-surface portion R3 may have a curvature in the same direction as the curvatures of the first curved-surface portion R1 and the second curved-surface portion R2 (i.e. the third curved-surface portion R3 is bulged toward the outside in the radial direction, when viewed from the outside in the radial direction). Further alternatively, the third curved-surface portion R3 may be formed into other shapes.

The number of the spokes 33 may not necessarily be the same as the number of the hub mounting bolt holes 32a.

Figure 4:
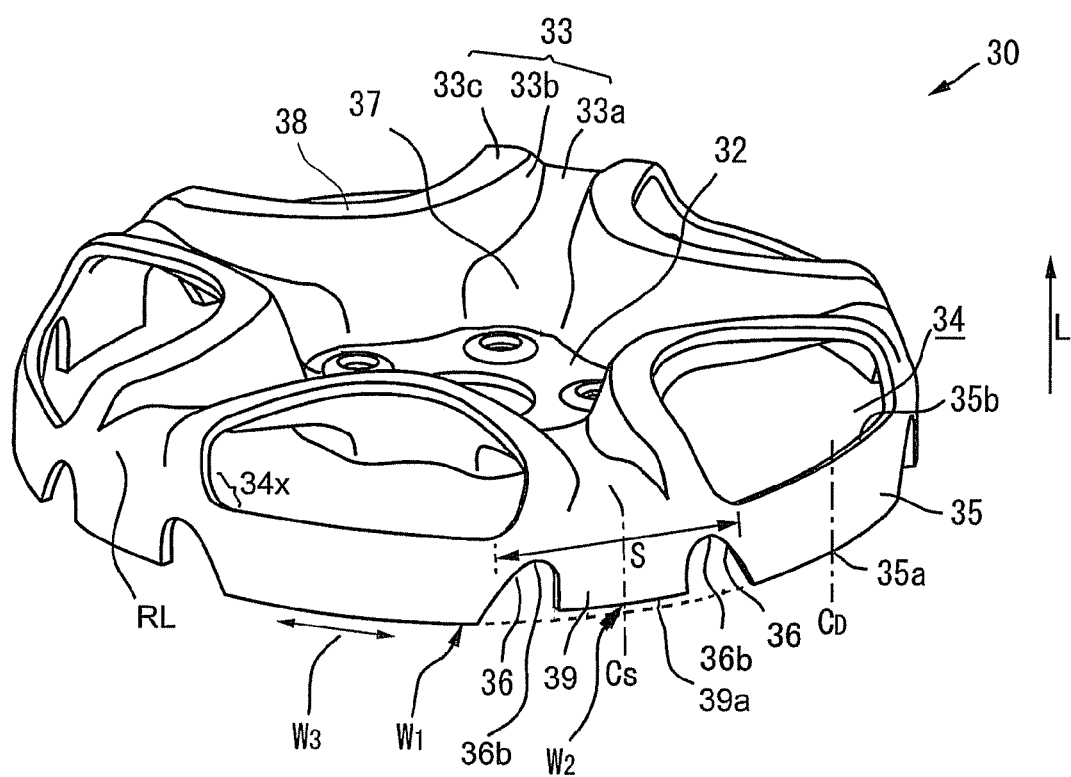
FIG. 4 is a perspective view of a disc.

The spokes 33 each has a pair of side walls 33b to reinforce the spokes. The pair of side walls 33b are raised from widthwise (the disc circumferential direction) ends of the spoke 33 toward the outside in the wheel axial direction. The edges 33c are formed continuously from respective outside ends of the raised side walls 33b in the wheel axial direction, and extend in the width direction and the radial direction of the spoke 33 substantially in parallel to the hub mounting portion 32. The edges 33c form an end edge of the spoke 33. In addition, a bottom wall 33a is formed on a middle part of the spoke 33 between the side walls 33b. Further, the side walls 33b of the two adjacent spokes 33, 33 are connected to each other proximate to the hub mounting portion 32, thereby forming the protrusion 38. As shown in FIG. 3 and FIG. 4, in the first curved-surface portion R1, the axial dimension of the side walls 33b of the spoke 33 may decrease toward the outside in the radial direction. In addition, in the conical connecting portion RL, the side walls 33b may no longer exist, while the end edges 33c may be merged into the bottom wall 33a, thereby constituting a part of a conical surface integrally formed in the width direction of the spoke 33 (the disc circumferential direction).

In this example, the side walls 33b are raised toward the outside in the wheel axial direction. However, the side walls 33b may be raised from the bottom wall 33a toward the inside in the wheel axial direction.

As shown in FIG. 3, the bottom wall 33a extends toward the outside in the radial direction from the inner-circumferential-side curved-surface connecting portion r to the outer-circumferential-side curved-surface connecting portion R, while extending toward the outside in the axial direction. As shown in FIG. 9 and FIG. 10, the bottom wall 33a may extend in a direction substantially orthogonal to the wheel axial direction (substantially in parallel to the hub mounting portion 32). In contrast to FIG. 3, the bottom wall 33a may extend toward the outside in the radial direction from the inner-circumferential-side curved-surface connecting portion r to the outer-circumferential-side curved-surface connecting portion R, while extending toward the inside in the axial direction.

As shown in FIG. 3, when a height H (a distance in the wheel axial direction) of the side walls 33b from the bottom wall 33a to the respective end edges 33c is maximized proximate to either an inside end or an outside end of the decorative hole 34 in the wheel radial direction, rigidity of the wheel is further improved. Particularly, a maximum value of the height H is preferably two to twenty times as large as the thickness of the side walls 33b, and most preferably four to ten times as large as the thickness of the side walls 33b. The maximum value of the height H is defined to fall within the above range, thereby enhancing rigidity of the wheel 10, while ensuring formability of the disc 30.

As shown in FIG. 2, a minimum width B1 of the spoke 33 in the disc circumferential direction is smaller than a maximum width B2 of the decorative hole 34 in the disc circumferential direction.

The following effects are produced depending on which position of the rim the disc flange 35 is joined to. When the disc flange 35 is fitted to a drop portion 24, a force applied from a tire is spread out, and accordingly, durability of the wheel improves. In contrast, when the disc flange 35 is fitted to an inner bead seat 22 or an outer bead seat 26, the disc 30 has a larger diameter, and accordingly, design of the wheel improves. When the disc flange 35 is fitted to an intermediate portion 22a, the disc 30 has a larger diameter and the disc flange 35 is apart from a contact portion with the tire. Accordingly, design and durability of the wheel both improve.

Meanwhile, the five substantially-triangle decorative holes 34 are formed, each of which is defined by the two adjacent spokes 33, 33, an outer circumferential end of the hub mounting portion 32, and an outside end of the disc flange 35 in the wheel axial direction. The decorative holes 34 each include corners 34x that are formed on the opposite sides of the decorative hole 34 in the disc circumferential direction. Typically the decorative holes 34 are formed for the purpose of reducing the weight of the disc and radiating heat. The shape of the decorative holes 34 is not limited to a triangle, but may also be an ellipse, a trapezoid or any other shape.

The disc flange 35 is positioned on an outside end of the disc in the wheel radial direction and connects the distal ends of the respective spokes 33 together in the disc circumferential direction. As shown in FIG. 3, the disc flange 35 is fitted to the drop portion 24 of the rim 20, and an inside part of the fitting area in the wheel axial direction is welded at a welding position W.

The rim 20 includes an inner flange 21, the inner bead seat 22, the intermediate portion 22a, an inner sidewall 23, the drop portion 24, an outer sidewall 25, the outer bead seat 26, and an outer flange 27 in the order from the inside in the wheel axial direction. The disc flange 35 may be fitted to the inner bead seat 22 or the outer bead seat 26 to be joined together. Alternatively, the disc flange 35 may be fitted to the intermediate portion 22a to be joined together. In the case that the disc flange 35 is joined to the inner bead seat 22 or the intermediate portion 22a, the disc 30 is oriented in a direction opposite to the direction shown in FIG. 3.

A structure of the disc 30 will be described in details below with reference to FIG. 4. A part of the disc flange 35, which corresponds to a radially outside end (distal end) S of the spoke 33, is cut out toward the outside in the wheel axial direction L relative to the disc-flange inside end edge 35a of the disc flange 35 on the inside in the wheel axial direction L to form notches 36. The notches 36 are formed by cutting out the part of the disc flange symmetrically with respect to the widthwise center line Cs of the spoke 33.

The part of the disc flange 35 corresponds to the radially outside end S of the spoke 33 is located proximate to outermost peripheries of the outer-circumferential-side curved-surface connecting portion R, the bottom wall 33a, and the end edge 33c of the spoke 33. The radially outside end S is a portion that connects the spoke 33 to the outside of the disc flange 35 in the wheel axial direction L.

The disc-flange inside end edge 35a of the disc flange 35 is an inside edge of a part of the disc flange 35 in the wheel axial direction L, wherein the disc-flange inside end edge 35a is located corresponds to a portion proximate to the middle position $C_D$ along the disc circumferential direction of the decorative hole 34 and other part of the decorative hole 34 excluding the corners 34x. Similarly, the disc-flange outside end edge 35b of the disc flange 35 is an outside edge of a part of the disc flange 35 in the wheel axial direction L, wherein the disc-flange outside end edge 35b is located corresponds to a portion proximate to the middle position $C_D$ along the disc circumferential direction of the decorative hole 34 and other part of the decorative hole 34 excluding the corners 34x.

Figure 14:
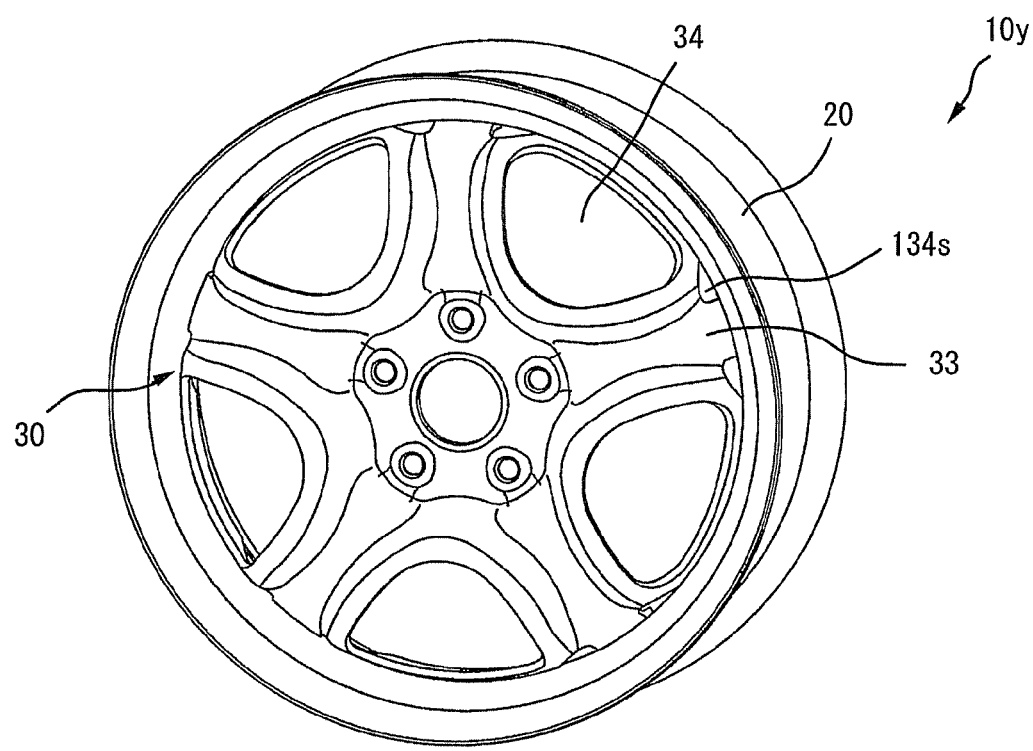
FIG. 14 is a perspective view of the automobile wheel according to the another modification of the first embodiment of the present invention.

The notches 36 each are formed into a convex shape toward the outside in the wheel axial direction L. In FIG. 4, the notches 36 each include an outermost-side edge (hereinafter referred to as "notch outermost edge") 36b that extends in the wheel axial direction L. The notch outermost edge 36b is positioned on the inside in the wheel axial direction L relative to the disc-flange outside end edge 35b. The notch outermost edge 36b extends through a fitting disc flange portion 35p (a part of the disc flange 35, which is fitted into the rim 20 (the drop portion 24 in FIG. 3) and is a radially outermost part of the disc 30 (see FIGS. 3, 5, 8, 9, 10, and 15)) of the disc 30 toward the outside in the wheel axial direction L, and splits the fitting disc flange portion 35p in the disc circumferential direction. Consequently, a part of the notch 36 is included in a fitting area between the disc 30 and the rim 20. As shown in FIG. 1 and FIG. 14, when the disc 30 and the rim 20 are assembled together, a part of the notch 36 (the notch outermost edge 36b) is exposed to the outside in the axial direction L beyond the fitting area between the fitting disc flange portion 35p and the rim 20, thereby forming a small decorative hole 34s.

However, the notch outermost edge 36b may be positioned on the outside in the wheel axial direction L relative to the disc-flange outside end edge 35b, or may not necessarily extend through the fitting disc flange portion 35p toward the outside in the wheel axial direction.

A part of the disc flange 35, which corresponds to the widthwise center line Cs of the spoke 33, forms a middle piece 39. The middle piece 39 extends toward the inside in the wheel axial direction L relative to the notch outermost edges 36b and separates the notches 36 from each other or reduces an axial length of the notches 36, thereby forming the notch outermost edges 36b on the opposite sides of the middle piece 39 in the disc circumferential direction. Preferably the notches 36 are symmetrical with respect to the widthwise center line Cs of the spoke 33 in order to secure sufficient strength of the wheel and keep the weight balance of the wheel. However, the notches 36 may not necessarily be exactly symmetrical with each other. The middle piece 39 is fitted to the drop portion 24 of the rim 20(the fitting area with the rim 20) and is welded thereto.

The middle piece 39 includes an inside end edge 39a in the wheel axial direction L (hereinafter referred to as "middle-piece end edge"). The middle-piece end edge 39a extends to a position on the outside in the axial direction L relative to the disc-flange inside end edge 35a. The notch outermost edge 36b is positioned on the inside in the wheel axial direction L relative to the disc-flange outside end edge 35b.

Figure 5:
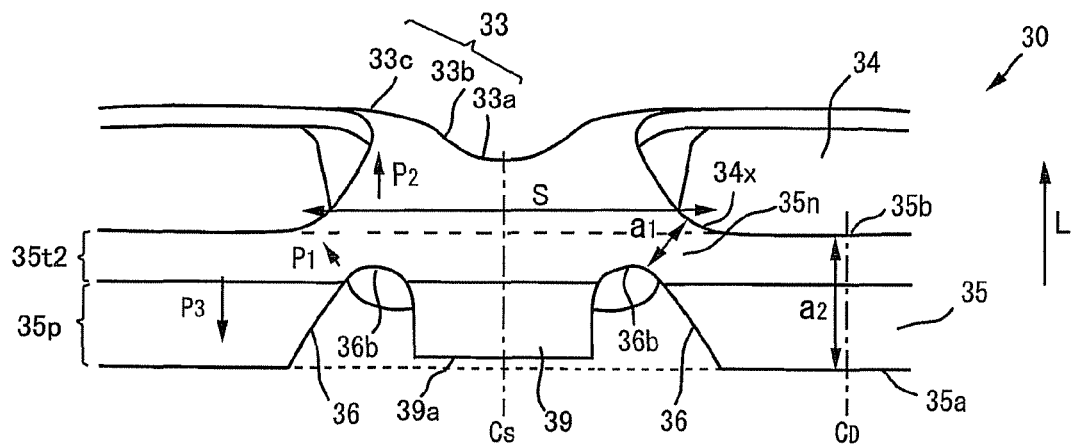
FIG. 5 is a side view of a spoke of the disc, when viewed from the outside in a wheel radial direction.

FIG. 5 is a side view of the spoke 33 of the disc 30, when viewed from the outside in the radial direction. A minimum distance $a_1$ between the notch 36 and an outer periphery of the decorative hole 34 is smaller than a width $a_2$ of the disc flange 35 in the wheel axial direction L at a position of the decorative hole 34 in the disc circumferential direction, excluding the corners 34x (in FIG. 5, a position proximate to the middle position $C_D$ is employed as a representative example of the "position of the decorative hole 34 in the disc circumferential direction"). As described above, a part of the disc flange 35, which has the minimum distance ($a_1$) between an axially inside end edge (including the notch 36) of the disc flange and the outer periphery of the decorative hole 34, forms a neck portion 35n. The neck portion 35n has a width smaller than the width of the other portion of the disc flange 35, and is close to each of the corners 34x of the decorative hole 34 on the distal-end side of the spoke. The position of the decorative hole 34 in the disc circumferential direction, excluding the corners 34x, is defined as a position of an axially innermost (radially outermost) part of an axially inside (radially outside) periphery of the decorative hole 34 excluding the corners 34x. As shown in FIG. 4 to FIG. 8, the axial width of the disc flange 35 is kept generally constant at periphery of the decorative hole 34 inside in the disc axial direction(outside in the disc radial direction), excluding the corners 34x. Thus, a position of any part of the inside periphery of the decorative hole 34 in the disc axial direction may be employed.

Since the neck portion 35n with a small width is formed where the minimum distance $a_1$ is smaller than the width $a_2$, in the process of forming a disc flange, forming the disc by pressing or the like in the wheel axial direction L causes a force to be applied to an area around the decorative hole 34 in an arrow P2 direction (a force to be applied to a spoke-side portion of the decorative hole) and in an arrow P3 direction (a force to be applied to a disc-flange-side portion of the decorative hole), as shown in FIG. 5, and also allows a material to be easily flowed to the corner 34x proximate to the neck portion 35n (shown by an arrow P1 in FIG. 5). This prevents cracks from occurring at the corner 34x due to the fabricating. The neck portion 35n with a small width is easily bent in the width direction (the wheel axial direction L or a direction of a plane of the disc flange 35). Accordingly, the material around the corner 34x is not easily elongated in the circumferential direction (in the direction of the plane of the disc flange 35) of the decorative hole. This further prevents cracks from occurring at the corner 34x due to forming the disc by pressing or the like. In addition, when the notches 36 are provided, the weight of the disc can be reduced.

However, if the minimum distance $a_1$ is too small, strength and durability of the disc 30 (the wheel 10) can be reduced. Thus, the minimum distance $a_1$ is equal to or greater than the thickness of the disc flange 35. The relationship between the minimum distance $a_1$ and the width $a_2$ may be expressed preferably as $a_2/3 <= a_1$, and more preferably as $a_2/2 <= a_1$.

Figure 6:
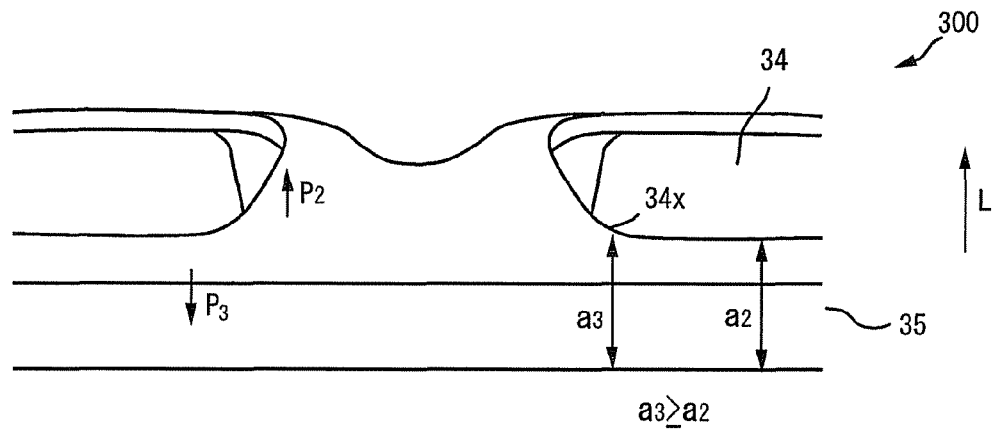
FIG. 6 is a side view of a spoke of a conventional disc with no notch, when viewed from the outside in the wheel radial direction.

FIG. 6 is a side view of the spoke 33 of a conventional disc 300 without the notches 36, when viewed from the outside in the wheel radial direction. When the notches 36 are not provided, a width $a_3$, at which a distance between the disc-flange inside end edge and the outer periphery of the decorative hole 34 at the corner 34x is minimized, is equal to or greater than the width $a_2$. In this case, forming the disc by pressing or the like in the wheel axial direction L causes a force to be applied to an area around the decorative hole 34 in the arrow P2 and the arrow P3 directions. However, since the width $a_3$ is equal to or greater than the width $a_2$, a material is not easily flowed to the corner 34x. In addition, since the disc flange 35 has a large width at its width $a_3$ portion, the disc flange 35 is not easily bent at the corner 34x. This increases an amount of elongating the material around the corner 34x, and cracks are more likely to occur at the corner 34x due to forming the disc by pressing or the like.

Figure 7:
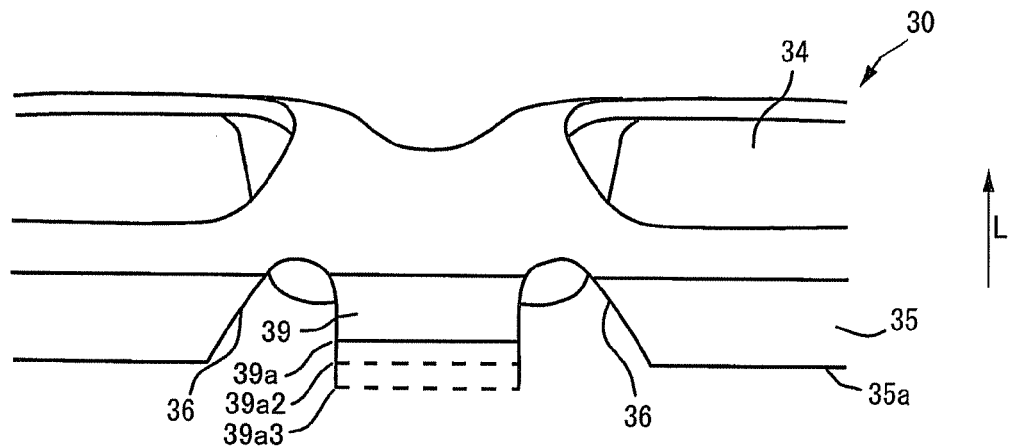
FIG. 7 is a side view of a spoke of a disc according to a modification of the first embodiment of the invention, when viewed from the outside in the wheel radial direction.

As shown in FIG. 7, the middle-piece end edge 39a may be located at the same position in the axial direction L as the disc-flange inside end edge 35a (reference numeral 39a2 in FIG. 7) or may be positioned on the inside in the axial direction L relative to the disc-flange inside end edge 35a (reference numeral 39a3 in FIG. 7). Particularly, as shown in FIG. 4 or FIG. 5, the middle-piece end edge 39a can be positioned on the outside in the axial direction L relative to the disc-flange inside end edge 35a, while being positioned along the axial direction L within a range where the fitting disc flange portion 35p (see FIG. 9 and FIG. 10) is formed. This is advantageous in improving durability of the wheel and reducing the weight and production cost of the wheel.

Figure 8:
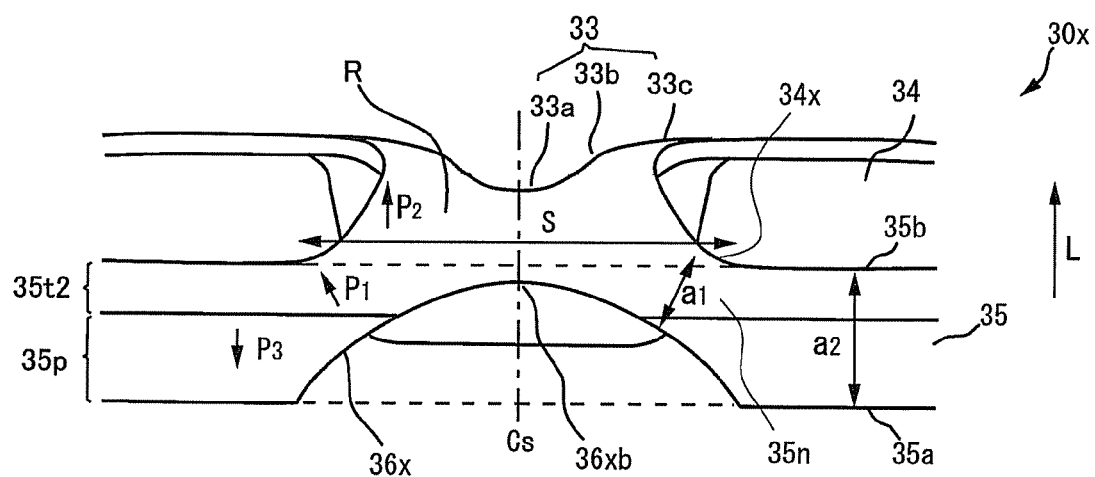
FIG. 8 is a side view of a spoke of a disc of an automobile wheel according to a second embodiment of the present invention, when viewed from the outside in the wheel radial direction.

FIG. 8 is a side view of a disc 30x of an automobile wheel according to a second embodiment of the present invention. A part of the disc flange 35 of the disc 30x, which corresponds to the radially outside end S of the spoke 33, is cut out toward the outside in the wheel axial direction L relative to the disc-flange inside end edge 35a of the disc flange 35 on the inside in the wheel axial direction L to form a notch 36x. The notch 36x is formed by cutting out the part of the disc flange 35 symmetrically with respect to the widthwise center line Cs of the spoke 33. The notch 36x is formed into one convex curved line toward the outside in the wheel axial direction L. An outermost edge 36xb is positioned on the inside in the wheel axial direction L relative to the disc-flange outside end edge 35b. However, the outermost edge 36xb may be positioned on the outside in the wheel axial direction L relative to the disc-flange outside end edge 35b.

In the disc 30x, the minimum distance $a_1$ is also smaller than the width $a_2$. This prevents cracks from occurring at the corner of the decorative hole 34 due to forming the disc by pressing or the like.

As shown in FIG. 4, the disc flange 35 can be joined (such as by welding), at a joint portion w1, to the rim at the welding position shown in FIG. 3. The joint portion w1 of the disc flange 35 is located adjacent to the notch 36 (the notch 36x in FIG. 8) and proximate to one of sides of the notch 36, which is more apart from the widthwise center line Cs of the spoke 33 in the disc circumferential direction. This allows a force to be effectively transmitted from the rim toward the spoke 33, and thus improves durability of the wheel.

In the case that the disc flange 35 has the middle piece 39, the disc flange 35 can be joined (such as by welding), at a joint portion w2 (the middle-piece end edge 39a) of the middle piece 39, to the rim. This allows a force to be effectively transmitted from the rim toward the spoke 33, and thus improves durability of the wheel.

In contrast, the disc flange 35 can be joined (such as by welding), at a joint portion w3, to the rim. The joint portion w3 is apart from the notch 36 (36x) in the disc circumferential direction and includes the middle position $C_D$ of the decorative hole 34 in the disc circumferential direction. This reduces stress acting on the spoke 33 (particularly on the outer-circumferential-side curved-surface connecting portion R) when rigidity of the spoke 33 is too high, and thus improves durability of the wheel.

The automobile wheel according to the present invention characteristically has the spokes and the large decorative holes to provide a similar appearance to aluminum wheels. Thus, welding is performed preferably on the inside of the aforementioned joint portions w1 to w3 in the wheel axial direction L, so that the welded portion cannot be seen externally. However, welding may also be performed on the outside of the joint portion in the wheel axial direction L, alternatively.

Similarly, the disc-flange outside end edge 35b located adjacent to the decorative hole is positioned preferably on the inside in the wheel axial direction relative to an axially outside end of the drop portion (the outer sidewall 25), so that the disc flange cannot be seen as protruding from the rim when viewed externally.

Also, as shown in FIG. 9, the disc flange 35 may include a fitting disc flange portion 35*p* and a connecting disc flange portion 35*t*. The fitting disc flange portion 35*p* extends in parallel to a corresponding fitting portion of the rim 20. The connecting disc flange portion 35*t* connects to the spoke 33 and to the edge of the decorative hole 34. In this case, the connecting disc flange portion 35*t* has, at its distal end (on the outside in the wheel axial direction L), a diameter that increases toward the spoke 33 and the decorative hole 34. The spoke 33 and the decorative hole 34 are connected to the distal end of the connecting disc flange portion 35*t*.

Desirably, a difference in radius (a step size) dl between the fitting disc flange portion 35*p* and the connecting disc flange portion 35*t* is smaller than the thickness (for example, 5 mm and more generally 2.5 mm to 8 mm) of the disc flange 35. More desirably, the step size d1 is equal to or greater than 0.5 mm and equal to or smaller than the thickness of the disc flange 35. When the step size dl is equal to or greater than 0.5 mm and equal to or smaller than the thickness of the disc flange 35, rigidity of the disc flange 35 improves, and accordingly, durability of the wheel 10 improves. In addition, this stepped portion facilitates positioning of the rim 20 and the disc 30 in the wheel axial direction at the time of assembling the rim 20 and the disc 30 together. If the step size dl is smaller than 0.5 mm, the stepped portion would be less effective in positioning of the rim 20 and the disc 30 in the wheel axial direction. Although the step size dl may be greater than the thickness of the disc flange 35, this can lead to deterioration in formability of the disc 30.

In contrast, as shown in FIGS. 3, 5, and 10, the disc flange 35 may include the fitting disc flange portion 35*p* and a connecting disc flange portion 35*t*2. The fitting disc flange portion 35*p* extends in parallel to a corresponding fitting portion of the rim 20. The connecting disc flange portion 35*t*2 connects to the spoke 33 and to the edge of the decorative hole 34. In this case, the connecting disc flange portion 35*t*2 has, at its distal end (on the outside in the wheel axial direction L), a diameter that decreases toward the spoke 33 and the decorative hole 34. The spoke 33 and the decorative hole 34 are connected to the distal end of the connecting disc flange portion 35*t*2.

Desirably, a difference in radius (a step size) d2 between the fitting disc flange portion 35*p* and the connecting disc flange portion 35*t*2 is smaller than the thickness of the disc flange 35. More desirably, the step size d2 is equal to or greater than 0.5 mm and equal to or smaller than the thickness of the disc flange 35. When the step size d2 is equal to or greater than 0.5 mm and equal to or smaller than the thickness of the disc flange 35, rigidity of the disc flange 35 improves, and accordingly, durability of the wheel 10 improves. This step size d2 also facilitates fitting of the disc 30 into the rim 20 at the time of assembling the rim 20 and the disc 30 together. Since the disc 30 is interference-fitted into the rim 20, if the step size d2 is smaller than 0.5 mm, the disc 30 is deformed in such a manner that the step size decreases, and accordingly the stepped portion would be less effective. Although the step size d2 may be greater than the thickness of the disc flange 35, this can lead to deterioration in formability of the disc 30 and a deterioration in design of the wheel due to the smaller decorative holes 34.

A total width Wt of the fitting disc flange portion 35*p* and the connecting disc flange portion 35*t* (or 35*t*2) in the wheel axial direction L is smaller than the minimum width B1 of the spoke 33 and also smaller than the maximum width B2 of the decorative hole 34 (see FIG. 2).

In the case that the disc flange 35 does not include the connecting disc flange portion 35*t* (or 35*t*2) shown in FIG. 9 and FIG. 10, the fitting disc flange portion 35*p* has a width Wf smaller than the minimum width B1 of the spoke 33 and also smaller than the maximum width B2 of the decorative hole 34.

Figure 13:
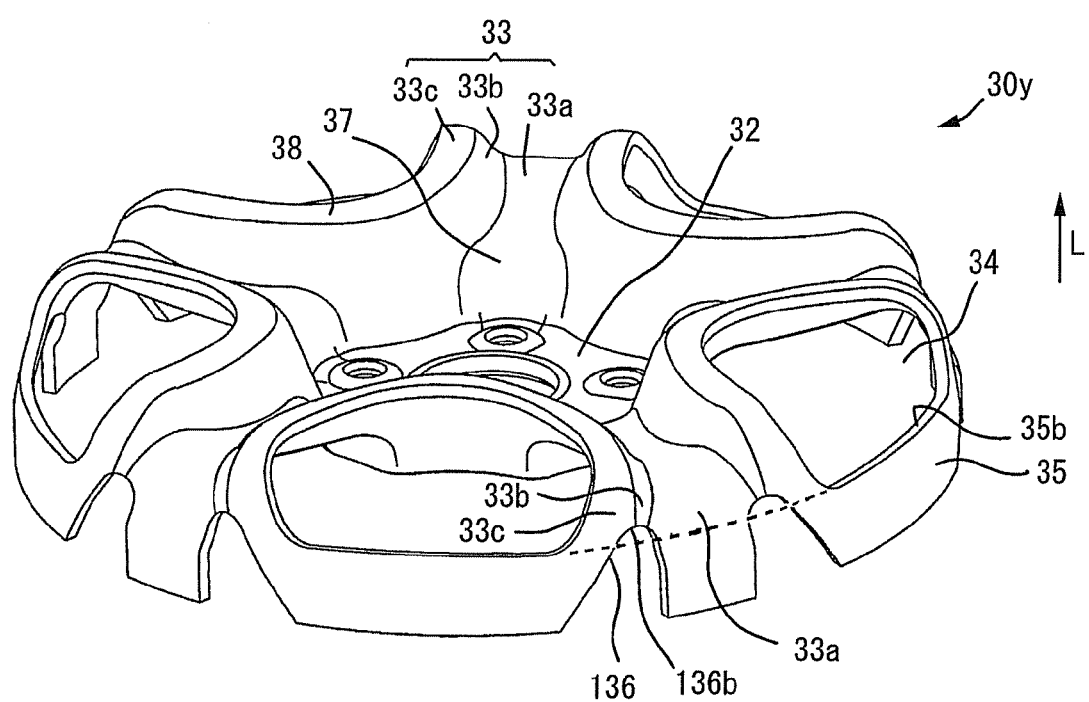
FIG. 13 is a perspective view of a disc of an automobile wheel according to another modification of the first embodiment of the present invention.

An automobile wheel 10*y* for according to another modification of the first embodiment of the invention will be described below with reference to FIG. 13 to FIG. 15. FIG. 13 is a perspective view of a disc 30*y* of the automobile wheel 10*y*. FIG. 14 is a perspective view of the automobile wheel 10*y*. FIG. 15 is a partial cross-sectional view of a spoke of the disc 30*y* obtained by cutting away in the wheel radial direction along a line passing through the wheel axis. The automobile wheel by is the same as the automobile wheel 10 including the disc 30 shown in FIG. 1 to FIG. 5, except the shape of notches 136 of the disc 30*y*. Thus, the same reference numerals are used to represent the same elements, and the descriptions thereof are not repeated.

As shown in FIG. 13, the notches 136 each include a notch outermost edge 136*b* that is positioned on an axially outside end of the notch 136. The notch outermost edge 136*b* extends toward the outside in the axial direction relative to the disc-flange outside end edge 35*b* and reaches the side wall 33*b* and the bottom wall 33*a* of the spoke 33. Thus, in each of the spokes 33, the notches 136 separate a pair of the side walls 33*b* at their respective radially outside end portions from each other and separate a pair of the end edges 33*c* at their respective radially outside end portions from each other in the disc circumferential direction. Similarly, the notches 136 also separate the disc flange 35 in the disc circumferential direction.

The notch outermost edge 136*b* is positioned on the outside in the wheel axial direction L relative to the disc-flange outside end edge 35*b*. Thus, as shown in FIG. 14, even when the disc 30 is fitted into the rim 20 to be assembled together, a part of the notch 136 (the notch outermost edge 136*b*) is exposed to the outside in the axial direction L beyond the fitting area between the fitting disc flange portion 35*p* and the rim 20, thereby forming a small decorative hole 134*s*.

The present invention is not limited to the aforementioned embodiments. For example, the present invention is not limited to a specific shape of the spokes or to a specific shape of the decorative holes. In addition, the present invention is not limited to a specific number of the spokes or to a specific number of the decorative holes, as long as a plurality of the spokes and a plurality of the decorative holes are provided. Further, the present invention is not limited to a specific shape, a specific number, or a specific protruding direction of the side walls of the spokes. Furthermore, an additional hole may be formed on the spokes for weight reduction.

EXAMPLE 1

Figure 11:
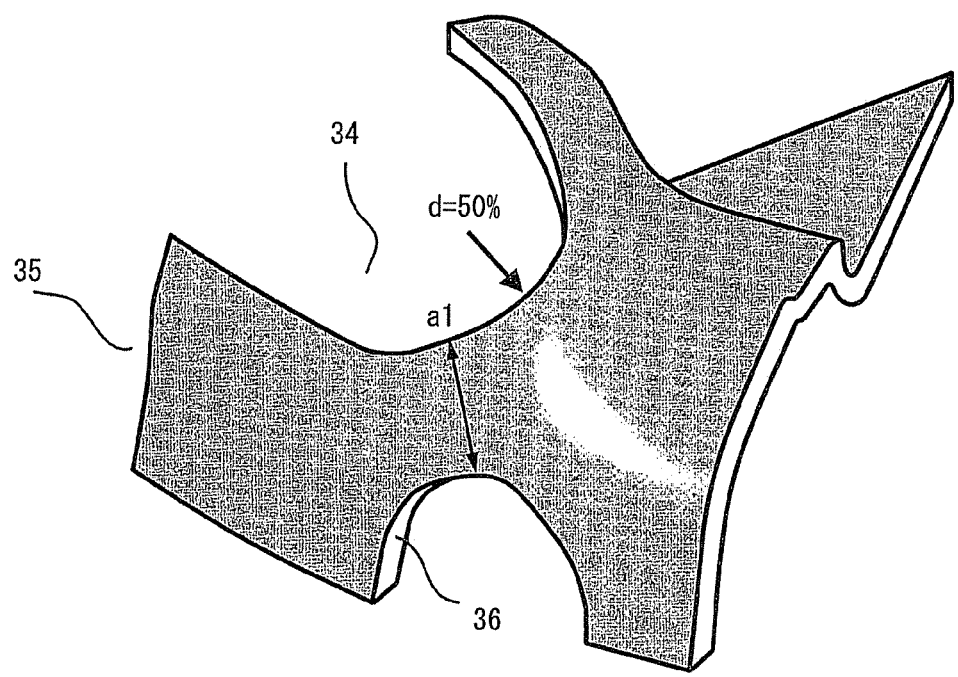
FIG. 11 shows results from a study of distortion of the disc with a notch, which occurred during forming the disc.
Figure 12:
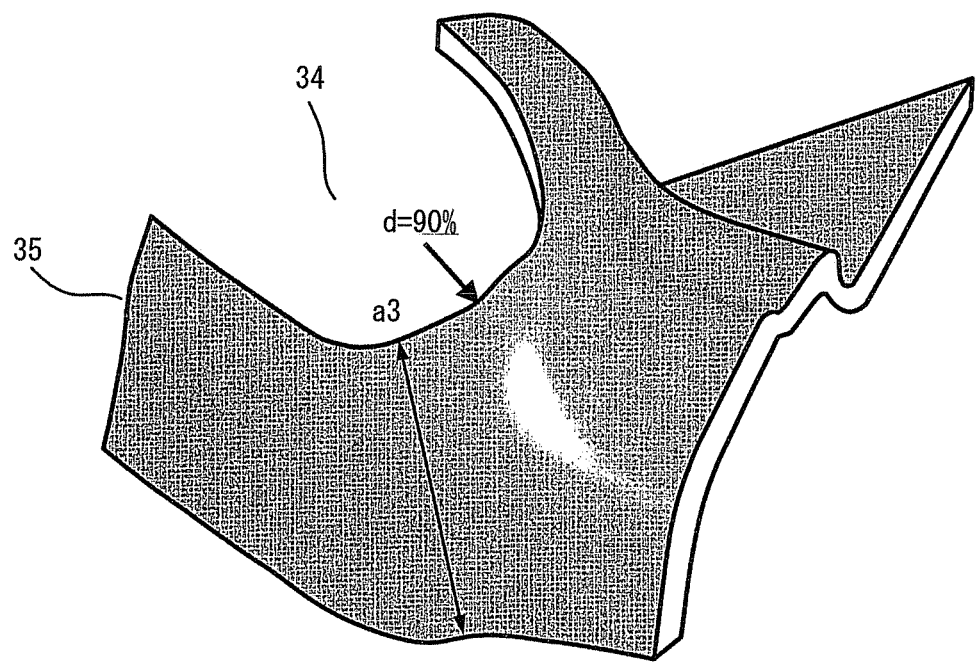
FIG. 12 shows results from a study of distortion of the disc with no notch, which occurred during forming the disc.

As shown in FIG. 4, distortion occurred on the disc 30 with the notches 36 was studied during forming the disc 30 by pressing or the like. The study was conducted on the distortion proximate to the corner of the decorative hole 34. The minimum distance $a_1$ was 25 mm and the width $a_2$ was 60 mm. For comparison, the same study was also conducted for the disc 300 with no notch, as shown in FIG. 6, but with the width $a_3$ ($=a_2$) of 60 mm. FIG. 11 and FIG. 12 show the results obtained from the studies.

As shown in FIG. 11, in the case when the disc 30 is provided with the notches 36, a maximum value of the distortion d proximate to the corner of the decorative hole 34 was approximately 50%.

In contrast, as shown in FIG. 12, in the case when the disc 300 is provided with no notch, a maximum value of the distortion d proximate to the corner of the decorative hole 34 reached approximately 90%. It was found that this case is more likely to cause cracks to occur at the corner of the decorative hole 34.

DESCRIPTION OF REFERENCE NUMERALS AND SYMBOLS 10 automobile wheel
20 rim
24 drop portion
30, 30x disc
33 spoke
34 decorative hole
34s small decorative hole
35 disc flange
35a disc-flange inside end edge
36, 36x notch
39 middle piece
38 protrusion
$a_1$ minimum distance between notch and outer periphery of decorative hole
$a_2$ width of disc flange in wheel axial direction corresponds to middle position along disc circumferential direction of decorative hole and other part of decorative hole excluding the corner
$C_S$ widthwise center line of spoke
$C_D$ middle position of decorative hole in disc circumferential direction
L wheel axial direction
S radially outside end of spoke

What is claimed is:

1. A wheel for vehicle comprising:
   (a) a rim having a drop portion; and
   (b) a disc including: a plurality of spokes that radially extend toward an outside in a wheel radial direction; and a disc flange that is positioned at an outside end in the wheel radial direction and that connects distal ends of the spokes on the outside in the wheel radial direction together in a disc circumferential direction, the disc having decorative holes each formed between the spokes, the decorative hole having a corner in the disc circumferential direction, in which the rim and the disc flange are joined together, wherein
   a part of the disc flange, which corresponds to a radially outside end of each of the spokes, is cut out toward an outside in a wheel axial direction relative to a disc-flange inside end edge of the disc flange on an inside in the wheel axial direction to form a notch, and
   a minimum distance ($a_1$) between the notch and an outer periphery of the decorative hole is smaller than a width ($a_2$) of the disc flange in the wheel axial direction at a position of the decorative hole in the disc circumferential direction, excluding the corner.

2. The wheel for vehicle according to claim 1, wherein a part of the disc flange, which corresponds to a widthwise center line of the spoke, has a middle piece that extends toward the inside in the wheel axial direction relative to an outermost edge of the notch in the wheel axial direction, and the middle piece is fitted to the rim.

3. The wheel for vehicle according to claim 2, wherein a fitting area between the middle piece and the rim is welded and joined together.

* * * * *